United States Patent [19]

Suzuki et al.

[11] 4,320,454
[45] Mar. 16, 1982

[54] APPARATUS AND METHOD FOR OPERAND FETCH CONTROL

[75] Inventors: Seigo Suzuki, Yokohama; Seiji Eguchi, Kawasaki; Yoshiaki Moriya, Inagi, all of Japan

[73] Assignee: Tokyo Shibaura Electric Co., Ltd., Japan

[21] Appl. No.: 45,258

[22] Filed: Jun. 4, 1979

Related U.S. Application Data

[63] Continuation-in-part of Ser. No. 878,084, Feb. 15, 1978, abandoned, which is a continuation of Ser. No. 747,348, Dec. 3, 1976, abandoned.

[30] Foreign Application Priority Data

Dec. 4, 1975 [JP] Japan .............................. 50-144627

[51] Int. Cl.³ .............................................. G06F 9/34
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,292,151 | 12/1966 | Barnes et al. | 364/200 |
| 3,601,812 | 8/1971 | Weisbecker | 364/200 |
| 3,614,741 | 10/1971 | McFarland, Jr. et al. | 364/200 |
| 3,657,705 | 4/1972 | Mekota, Jr. et al. | 364/200 |
| 3,889,237 | 6/1975 | Alferness et al. | 364/200 |
| 3,949,378 | 4/1976 | Crabb et al. | 364/200 |
| 3,972,025 | 7/1976 | Taddei | 364/200 |
| 3,976,976 | 8/1976 | Khosharian | 364/200 |
| 4,117,536 | 9/1978 | Bodner | 364/200 |

*Primary Examiner*—Gareth D. Shaw
*Assistant Examiner*—Thomas M. Heckler
*Attorney, Agent, or Firm*—Finnegan, Henderson, Farabow, Garrett & Dunner

[57] ABSTRACT

An operand fetch control system wherein an address modification mode code is provided in the instruction word and designates both the general storage location of an operand to be fetched and the mode of addressing required for fetching it. The address modification mode code is a two-bit binary number designating either a direct register addressing mode or a main memory indirect, index, or indirect index addressing mode. Mode code 00 designates the register mode while the codes 10, 01 and 11 designate the indirect mode, the index mode and the indirect index mode, respectively.

19 Claims, 8 Drawing Figures

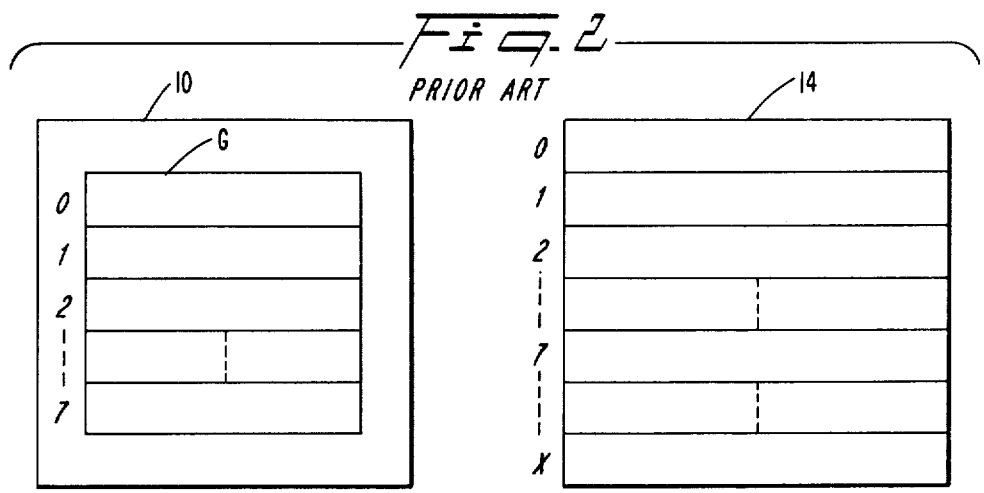
Fig. 2 PRIOR ART
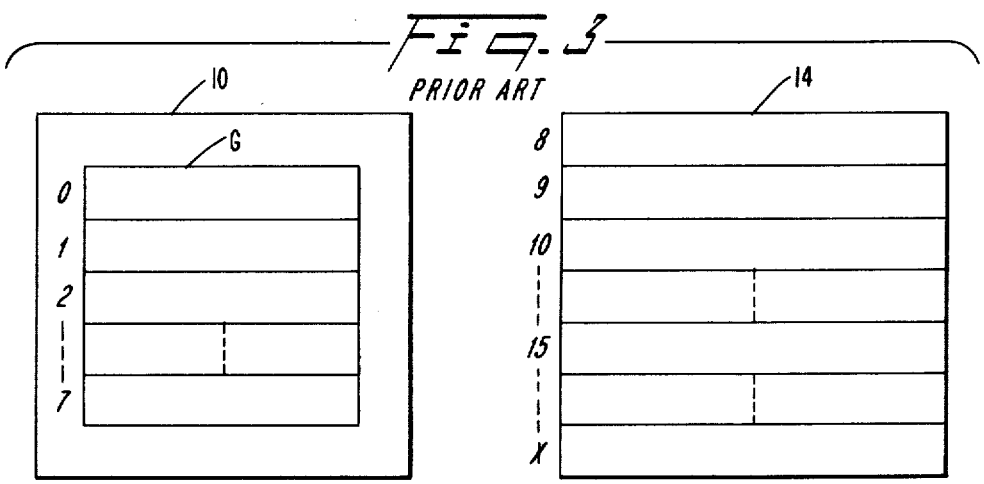
Fig. 3 PRIOR ART
Fig. 4

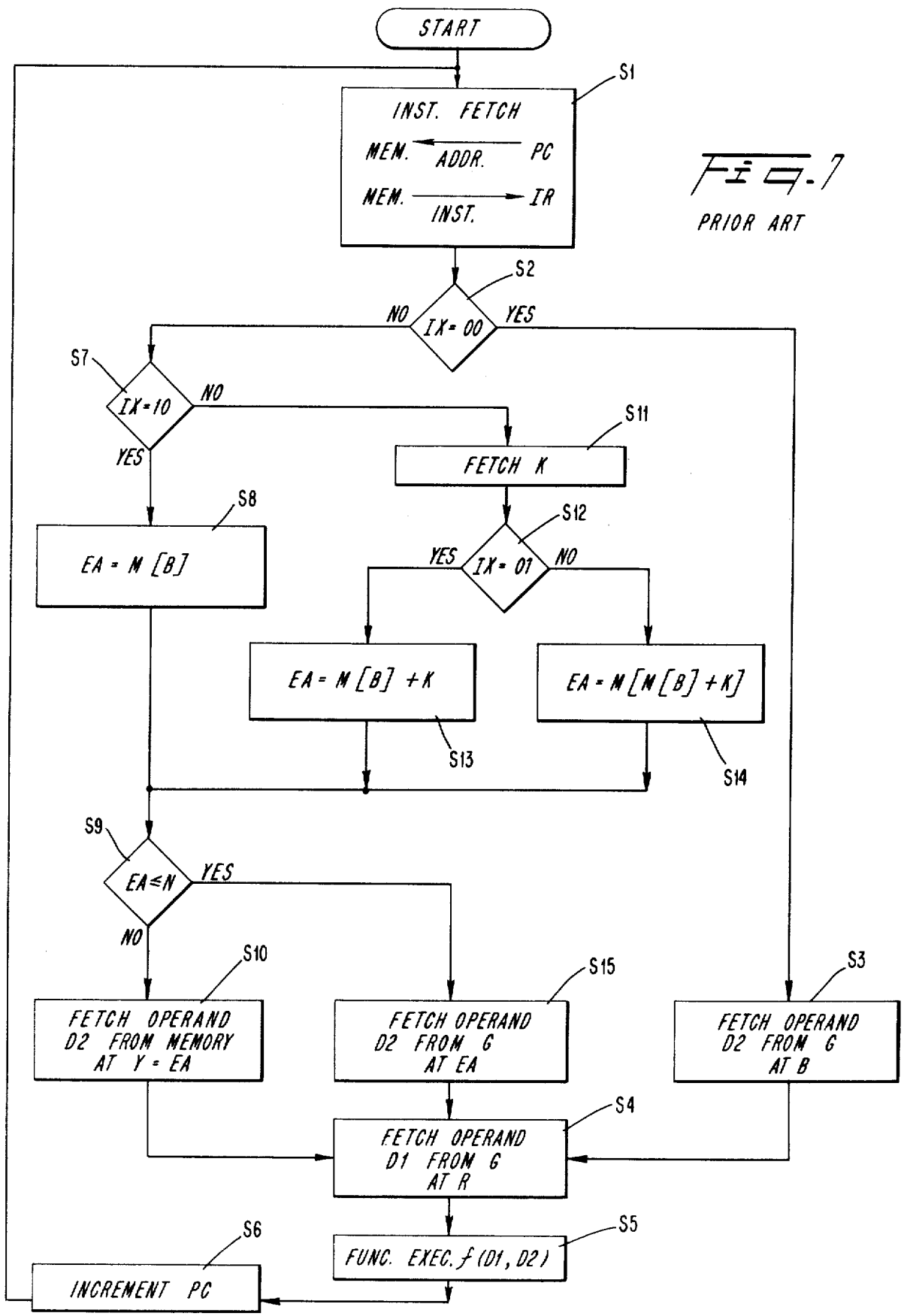

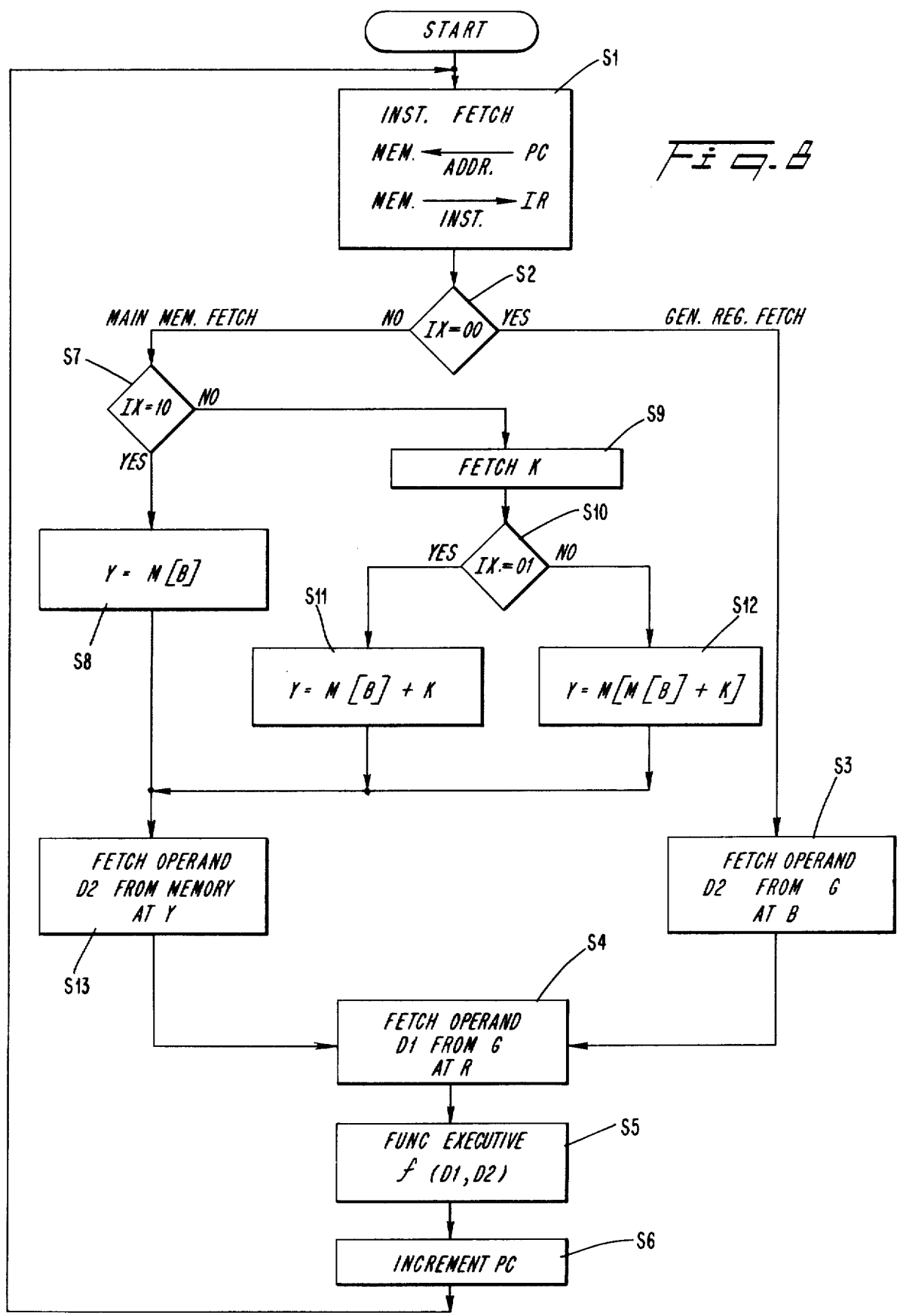

APPARATUS AND METHOD FOR OPERAND FETCH CONTROL

RELATED APPLICATIONS

This is a continuation-in-part application of our co-pending application Ser. No. 878,084, filed Feb. 15, 1978, abandoned, which in turn is a continuation of application Ser. No. 747,348, filed Dec. 3, 1976, abandoned.

BACKGROUND OF THE INVENTION

The present invention relates to a method and apparatus for controlling the operation of a data processing system and, in particular, for controlling an operand fetch operation therein.

A central processing unit (CPU) in a computer system executes data processing tasks or jobs in response to a series of program instructions and data received from an associated external memory unit. The CPU is provided with an internal memory, often referred to as a general register or plurality of general registers, which are utilized for a variety of data storage functions connected with the transfer of data and instructions between the external memory and the CPU and with the execution of programs by the CPU. One or more of the general registers may be used, for example, to perform the function of an accumulator or an index register at various times during operation of the system.

The general registers are addressable in the same manner as the storage locations of the external memory and data stored in the registers and external memory is accessed through operation of some form of operand fetch routine. Conventional systems fall into two general categories: one type employs the same addresses for the internal register locations and the initial storage locations of the external memory and the other type employs different addresses for these two groups of memory locations.

With the former type of system a standarized instruction format may be employed for the internal and external memories, thereby resulting in a very simple program construction. This type of control system, however, is undesirable for many applications in that, since it is impossible to separately designate the respective internal and external memory regions having common addresses, the portion of the external memory which utilizes addresses identical to those of the internal memory are unavailable for use. On the other hand, in a system using different addresses for the internal and external memories, full utilization of the external memory capacity is permissible since there is no address redundancy. However, a drawback of this system is that it is difficult to standardize the instruction format, whereupon program construction and execution is made more complex.

OBJECTS AND SUMMARY OF THE INVENTION

It is accordingly an object of the present invention to provide an improved operand fetch control system wherein, when the same addresses are employed for the internal and external memories, a standardized instruction format may be employed and the capacity of the external memory may still be fully utilized.

To achieve the foregoing objects and in accordance with the purpose of the invention, as embodied and broadly described herein, a method and apparatus is provided for fetching operands in a data processing system having a central processing unit including an instruction register and a plurality of general registers, the system further including a main memory unit coupled for communication with the central processing unit and means for addressing the general registers and the main memory unit to access the registers and selected storage locations in the memory to fetch data therefrom, the apparatus and method comprising means for executing the step of entering an instruction word into the instruction register, such instruction word including an operand address code and an address modification mode code, the latter specifying the general storage location of an operand and the mode of addressing required to fetch it, further means for executing the steps of determining from the address modification mode code whether an operand is stored in the general registers or in the main memory and deriving the address of the operand from the operand address code in accordance with the mode of addressing specified by the mode code, and additional means for performing the step of executing an operand fetch in either the general registers or in the main memory at the address derived in the last-mentioned step.

In accordance with further aspects of the invention the aforesaid fetch operation is executed at the general register address identified by the operand address code when the address modification mode code indicates that the operand is stored in the general registers. On the other hand, when the address modification mode code indicates that the operand is stored in the main memory, the operand is fetched either through an indirect register addressing operation, an index addressing operation or an indirect index addressing operation from the main memory at an address derived from the operand address code.

BRIEF DESCRIPTION OF THE DRAWINGS

The accompanying drawings, which are incorporated in and constitute a part of the specification, illustrate an embodiment of the invention and, together with the description, serve to explain the principles of the invention. In the drawings:

FIG. 2 is a schematic diagram illustrating the internal memory of the CPU including general registers 0-7 and also showing the initial section of the external memory unit having a group of storage locations utilizing addresses 0-7 identical to those of the general registers;

FIG. 3 is a schematic diagram showing the internal and external memories in a system wherein the initial storage locations of the external memory are designated by addresses which do not overlap those of the general register;

FIG. 4 is a schematic diagram of the instruction word format utilized with the present invention;

FIG. 7 is a schematic flowchart diagram illustrating the operation of control software used in the prior art system for performing operand fetch operations at the beginning of an instruction execution cycle;

FIG. 8 is a schematic flowchart diagram illustrating the control software instructions utilized in the system of the invention for controlling operand fetches.

DETAILED DESCRIPTION OF THE EMBODIMENT

Figure 1:
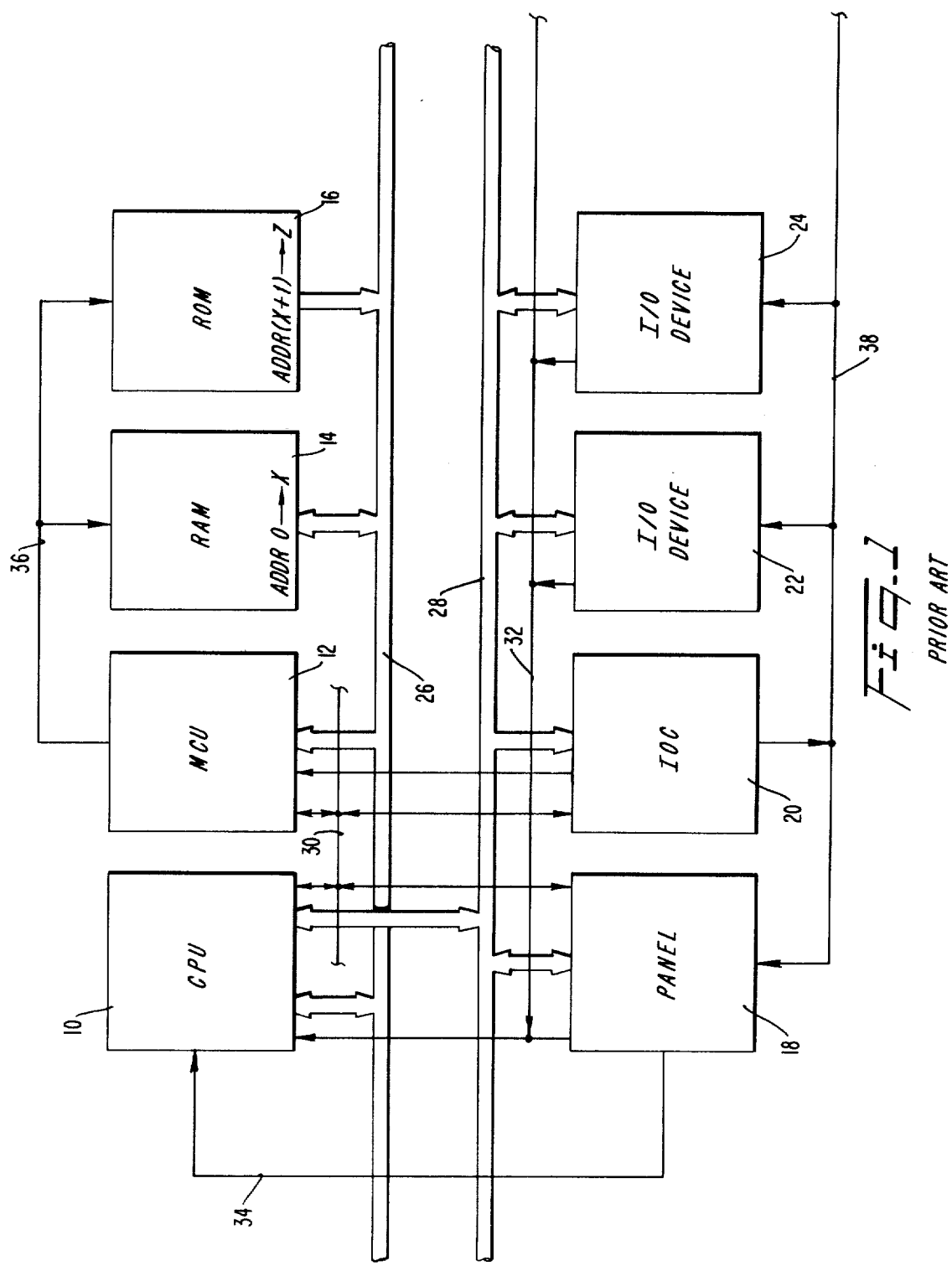
FIG. 1 is a schematic block diagram illustrating a data processing system of a known type which may be adapted to implement the present invention in a manner hereinafter described.

Referring to FIG. 1, a typical data processing system is shown which may represent, for example, a microprocessor. The system includes a central processing unit (CPU) 10 and external memory units 14 and 16. Unit 14 may be a random access memory (RAM) for storing program macroinstructions and data to be operated on by the CPU, and memory unit 16 may, for example, constitute a read only memory (ROM) used for storing control microinstructions. The addresses of memory 14 are designated 0 through X and the addresses of memory 16 are designated X+1 through Z.

A memory control unit (MCU) 12 is provided for supervising the exchange of data between the CPU and the memory units over a common memory bus 26. Control signals are transferred between the CPU 10 and MCU 12 over a bus control line 30 and memory address and control signals are communicated from the MCU 12 to memory units 14 and 16 via an address control bus 36.

The system further includes a plurality of input/output (I/O) units including a control panel 18 and I/O devices 22 and 24. Transfer of data between the CPU and the I/O units occurs over a common I/O bus 28 and is supervised by an input-output control unit IOC 20, which is also coupled to the I/O bus 28 and which transmits control signals to the I/O units 18, 22, and 24 via a control bus 38. A further control bus 32 is provided to enable the I/O devices to transfer interrupt requests and other control data to the CPU. Further, a direct control line 34 is provided between control panel 18 and CPU 10 to enable coupling of direct control signals therebetween.

In operation, data originating at the I/O units is transferred to CPU 10 or memory 14 and is operated upon by the CPU in accordance with program information stored in memory units 14 and 16. Resultant output data is transferred from CPU 10 back to the memory or to the I/O units, also under program control.

FIG. 2 schematically illustrates an internal memory unit G provided within CPU 10 and also shows external memory unit 14. The internal memory G, known as the general register or general registers, has a plurality of general register locations designated by addresses 0-7. By the same token, the first eight storage locations of memory unit 14 are, in accordance with the usual techniques of memory design and construction, also designated by the addresses 0-7. In employing a simplified, standardized instruction format in the system, it is impossible to utilize the storage locations at addresses 0-7 in memory unit 14 since they overlap with the addresses of the general registers.

The system of FIG. 2 may be configured through special adaptation to enable the first eight storage locations in external memory unit 14 to be designated by the addresses 8-15 to prevent overlap with the general register addresses. This enables utilization of the full memory capacity of memory unit 14 but complicates the system to the extent that a standardized instruction format cannot be used.

In accordance with principles of the invention, the data processing system utilizes an instruction word format, shown in FIG. 4, including an operand address code and an address modification mode code specifying the general storage location of an operand and the mode of addressing required to fetch it. As embodied herein and shown in FIG. 4, the instruction word format employs operand address code B and address modification mode code IX. The latter occupies bit positions 7 and 8 in a twelve bit instruction word and the former occupies bit positions 9-11. Together the codes B and IX designate the storage location of a second operand D2.

In accordance with additional features of the system herein described, the standardized instruction word further includes a function identifier code and a second operand address code. As embodied herein the function identifier code OP occupies bit positions 0-3 and serves to define the data processing operation to be performed in response to the instruction. The second operand address code R occupies bit positions 4-6 and specifies the storage location in the general registers of a first operand D1.

In accordance with still a further feature of the invention, the instruction word includes an index address component code. As embodied herein and shown in FIG. 4, the index address component code K is a twelve bit word provided immediately adjacent the basic instruction word such that where the index address component code is employed, the instruction assumes a dual-word format. The operand identifier code OP designates a data processing operation such as "CLEAR", "LOAD", "COMPARE", "ADD", etc. and interpretation of this code by the system determines the type of data processing operation executed during the particular instruction cycle.

Address modification mode code IX modifies address code B and, as will be described in detail hereinafter, specifies both the general storage location of the operand D2 in the system memory and the mode of addressing required to fetch it. The index address component code K is used when the mode of addressing of the operand D2, as defined by the IX code, is either an index mode or an indirect index mode and is employed during the fetch operation to calculate the operand address.

Figure 5:
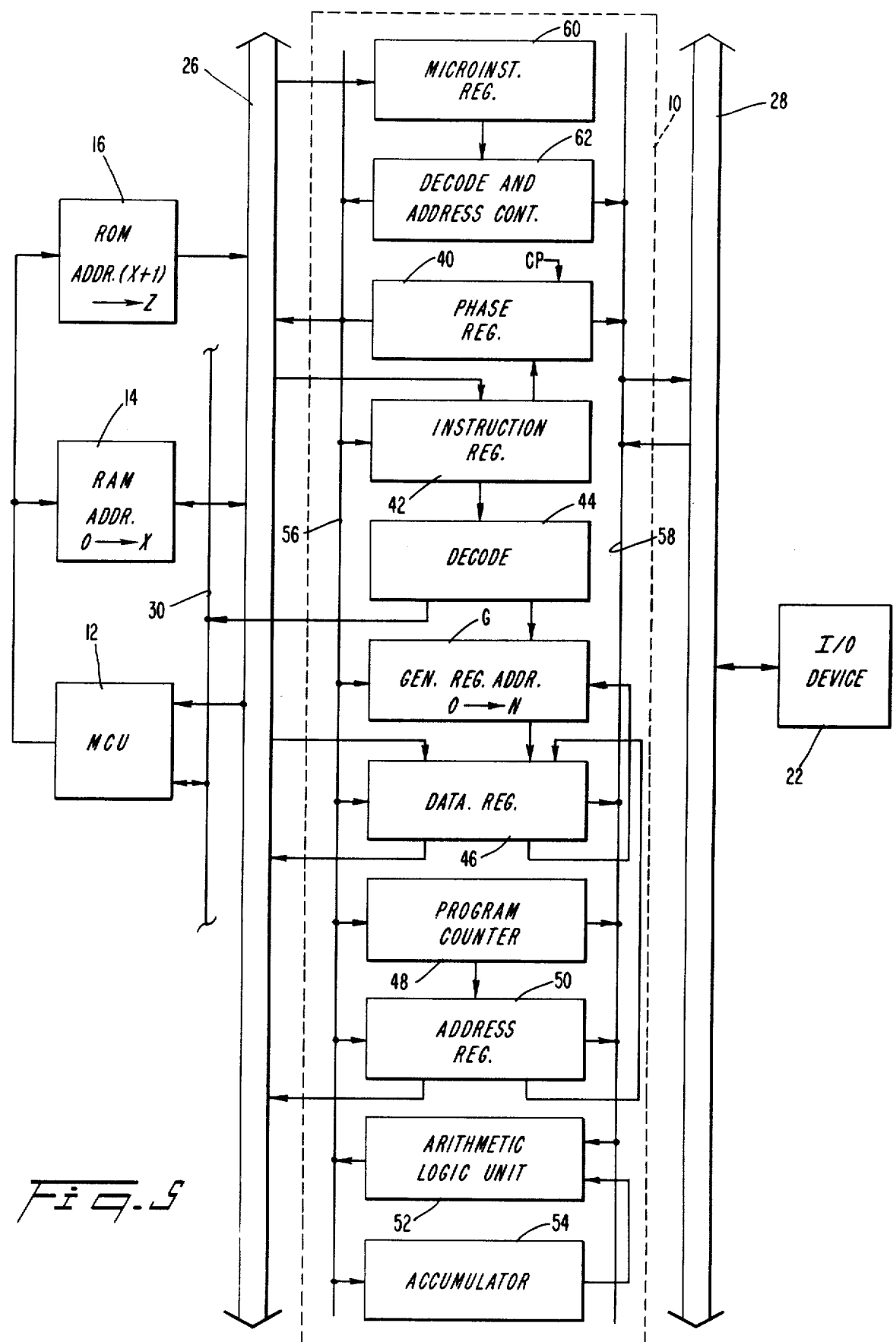
FIG. 5 is a schematic diagram showing the CPU of the FIG. 1 system in greater detail.

FIG. 5 illustrates CPU 10 and the basic components thereof. The instruction execution cycle timing is provided by a phase register 40 which receives clock pulses CP and generates a sequence of control signals which condition the various phases of the execution cycle. An instruction register 42 receives each macroinstruction from external RAM unit 14 and feeds the control data thereof to an instruction decoder 44 which provides output signals to the memory control unit 12 and general register G to control accessing thereof in response to the type of operation specified by the function identifier code and by the address modification mode code in the instruction word.

General register G includes a number of addressable register locations, e.g., eight as illustrated in FIGS. 2 and 3, which are used to store program status data, etc. and which may be utilized for various functions by the program. As shown, the general register addresses are generally defined as O through N. A data register 46 is provided for receiving input data which is to be operated on by the program and for handling result data which is to be transferred to memory or to the I/O bus 28.

Program counter 48 contains the address of the next macroinstruction to be executed and address register 50 stores this address for utilization during the instruction fetch operation at the beginning of each instruction execution cycle.

Arithmetic logic unit (ALU) 52 provides the basic data processing capacity in the system, along with accumulator register 54. A microinstruction register 60 receives microinstructions from ROM 16 which implement the microsteps, including fetch operations, performed in executing the basic functions of the macroinstructions loaded into instruction register 42. Decode and address control unit 62 responds to the microinstructions to control the addressing of the general registers and memory units.

Figure 6:
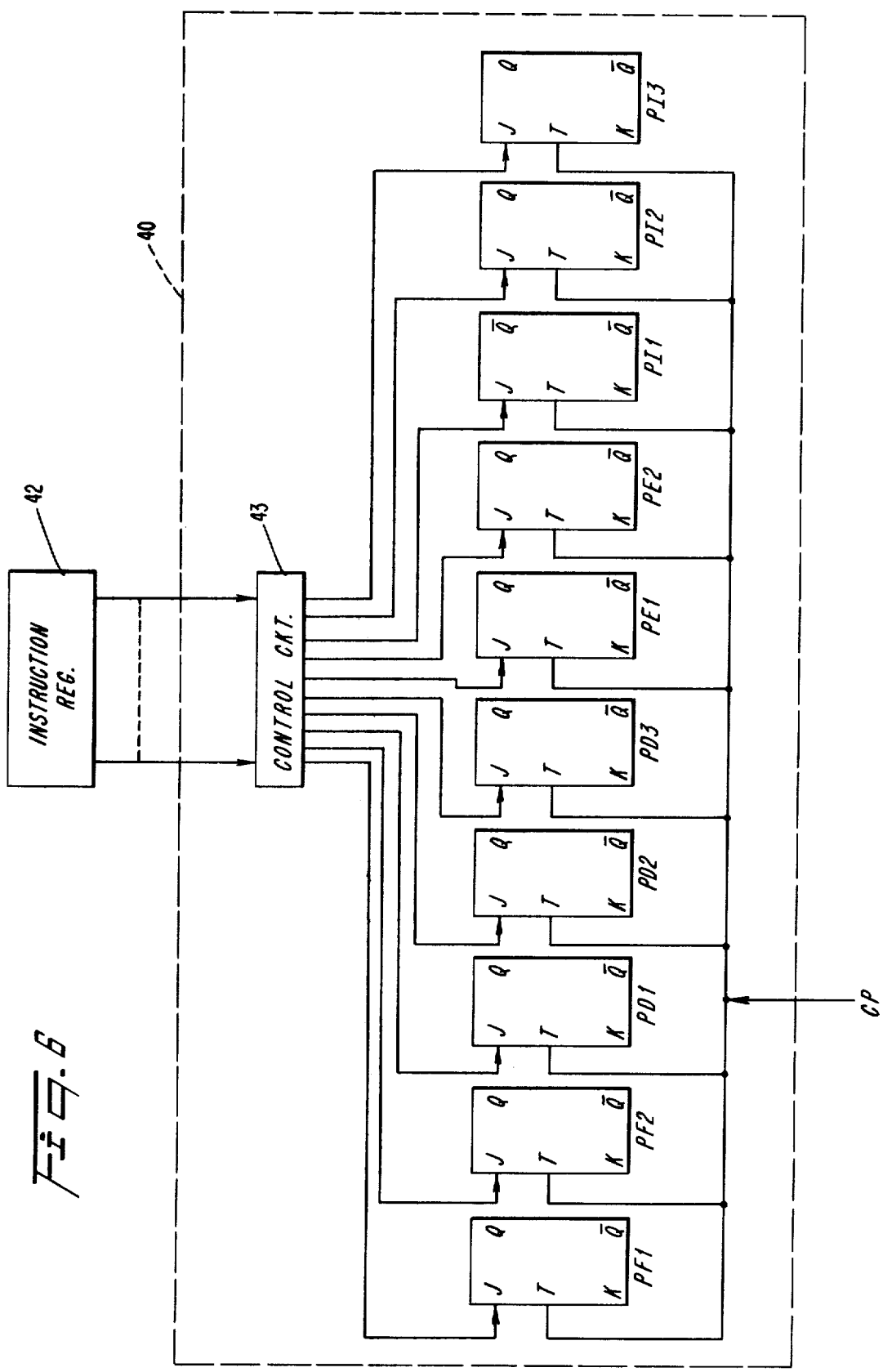
FIG. 6 is a schematic diagram showing the construction of the phase register utilized in the CPU shown in FIG. 5.

The timing and control signals employed for executing basic microprogram instruction sequences during the instruction execution cycle is provided by the phase register, which is shown in detail in FIG. 6. The execution cycle begins with the fetching of a macroinstruction from main memory unit 14 and the loading of such instruction into instruction register 42. The phase register comprises ten J-K flip-flops PF1 and 2, PD1, 2, and 3, PE1 and 2, and PI1, 2, and 3. Clock pulses CP occurring at a frequency, for example, 10 MHz., are applied to the trigger inputs T of each of the flip-flops, whereby a triggering input is presented every 0.1 microseconds.

A control circuit 43 interprets the output of instruction register 42 and feeds an input to the J terminal of each flip-flop in accordance with the type of data processing operation called for, whereby the basic configuration of timing signals for the given instruction execution cycle is established. Flip-flops PF1 and PF2 define the fetch cycle. Flip-flop PF1 is set for the period during which a macroinstruction is read out of the main memory and loaded into the instruction register. Flip-flop PF2 is set for the period during which the contents of the general register storage locations identified by the operand address codes R and B are fetched from the general register and loaded into the data register.

Flip-flops PD1, PD2 and PD3 establish the basic timing cycle for controlling the calculation of effective addresses required during indirect and index addressing modes. Flip-flops PE1 and PE2 define the intervals within the cycle during which the basic instruction is executed. Flip-flops PI1, PI2, and PI3 control the timing of an interrupt cycle during which interrupt requests are received and executed.

OPERATION

With reference now to FIG. 7, the operation of a prior art instruction execute cycle is described. At the beginning of the cycle, when phase register flip-flop PF1 is set, the first of a series of fetch control microinstructions is read from main ROM unit 16 and loaded into microinstruction register 60. The initial sequence of microinstructions supplied to the microinstruction register and interpreted by decode and address control unit 62 causes the macroinstruction stored at the address specified by program counter 48 to be fetched from main memory unit 14 and loaded into instruction register 42. This basic fetch operation is indicated by step S1 in FIG. 7.

Thereafter, a microinstruction is issued to execute the compare operation S2. Step S2 determines whether the IX bits in bit positions 7 and 8 of the instruction word are 00. If 00 is detected, a fetch microinstruction S3 is employed to fetch the second operand D2 from general register G at the general register address B provided in the instruction word. Thereafter, microstep S4 is executed to fetch the first operand D1 from general register address R, also provided in the instruction word, and following that step S5 is performed to execute the function f (D1, D2) called for by the function identifier code OP of the instruction word. The instruction execute cycle then moves to step S6 where the program counter is incremented to provide the address of the next instruction to be executed, and the program returns to start to initiate the next cycle.

In the direct register addressing mode called for when the IX bits are 00, the second operand D2 is thus accessed in the general register specified by address B.

If the IX bits are other than 00, the sequence of microinstructions supplied from ROM 16 branches from step S2 to step S7 where it is ascertained whether the IX bits are equal to 10. If 10 is detected, microprogram steps S8 and S9 are executed. Step S8 calculates an effective address EA which is equal to M[B]. Thus the effective address EA is represented by the contents of the general register specified by general register address B. In step S9, it is ascertained whether the effective address is equal to or less than the maximum general register address N. If the result is YES, then the system executes step S15 to obtain operand D2 from the particular general register location specified by the effective address EA. If the result of step S9 is NO, then a fetch is carried out in the main memory to obtain operand D2 from the main memory address Y which is equal to EA. This fetch operation occurs in step S10.

After operand D2 has been fetched and loaded into data register 46, microprogram steps S4, S5, and S6 are executed to complete the instruction cycle, as previously described.

If the IX address modification mode bits are either 01 or 11, the microprogram branches at step S7 to execute the index addressing mode steps S11, S12, S13 or S11, S12, S14. These steps result in the calculation of an effective address of the second operand D2 which is represented by M[B]+K or M[M[B]+K]. After the index mode effective address is thus calculated, the microprogram advances to step S9 to again determine whether the effective address is a general register address or an address in the main memory, whereupon either the main memory fetch S10 or the general register fetch S15 is executed to retrieve the operand D2.

Thus, as seen from the above, in the prior art system addresses 0 through N are reserved for the general register only and cannot be used to designate valid storage locations in the main memory. The storage locations thus provided in the main memory at the addresses 0 through N cannot be used and represent unavailable, wasted memory capacity. Furthermore, in the indirect and index modes of addressing, the prior art system is unable to determine whether a main memory or general register fetch is required until the effective address is calculated and compared in microprogram step S9 against N.

Turning to FIG. 8, the improved operation achieved by the present invention is hereinafter described. The initial macroinstruction fetch step S1 is the same as in the above-described prior art system. However, the system employs step S2 to determine at the outset whether the operand fetch is to be performed in the main memory or in the general registers. In accordance with the principles of the invention, the direct register addressing mode designated by IX bits 00 is, as in the prior art system, executed as a general register fetch but, unlike the prior art system, all other address modification mode bit combinations are employed to designate main memory fetches.

Thus, when IX=00, the microprogram according to the invention executes steps S3, S4, S5, and S6, as in the prior art program. However, when the IX bits are 10, 01, or 11 a main memory address Y is calculated and a main memory fetch is executed at step S13 without regard to the value of the calculated address.

As shown in FIG. 8 when IX=10, as determined at step S7, the indirect register addressing mode is specified and the microprogram advances to step S8 and calculates the main memory address Y=M[B]. During fetch step S13 the operand D2 is read from the main memory address Y specified by the contents of the general register addressed by the operand address code B.

If the determination at step S7 is NO then the system proceeds into the index addressing mode and in step S9 fetches the index address component code K which resides in the instruction register 42 as the second word in the dual-word instruction format (see FIG. 4). Thereafter, if IX=01 the direct index addressing mode is specified and the program branches to step S11 where the effective address Y is calculated as M[B]+K. As previously described, this indicates that the contents of the general register at address B are added to the component code K to yield the operand address Y in the main memory. Thereafter at step S13 operand D2 is fetched from the address Y in main memory.

If the IX bits are 11, then the program branches at step S10 to step S12 and the indirect index addressing mode is specified. Thus, the main memory address Y=M[M[B]+K] is calculated. Thereafter during step S13, a main memory fetch is executed to read the operand D2 from the address in main memory represented by the contents of the address in main memory which is represented by the sum of the index address component K and the contents of the general register addressed by the operand address code B.

After operand D2 is fetched, the program proceeds through steps S4, S5, and S6, as described above to complete the instruction execution cycle.

Thus, in comparing the operation of the system of the invention with that of the prior art, it is seen that not only is the operand fetch sequence simplified by the elimination of the EA≦N compare step (S9) and dual general register fetch steps (S3 and S15) of the prior art system, but also the present system obtains the substantial benefit of utilizing the main memory address location 0 through N which heretofore have been unavailable for use. This is because the address modification mode code (IX) employed in the instruction word is utilized to perform the dual function of both designating the general storage location of the operand, i.e., as being in either the general registers or the main memory, as well as designating the required addressing mode. Thus, since the IX bit combinations 01, 10, and 11 automatically invoke a main memory fetch, addresses identical to the general register addresses 0 through N can be used without in any way altering the basic standardized instruction format used with the system. In other words, with the operand fetch control microprogram utilized (FIG. 8) the system recognizes the B field operand address code as indirectly designating a main memory address for the second operand D2 whenever a 1-bit appears in the IX field. When no 1-bit appears in the IX field, the system recognizes the B field address as directly designating the location of the second operand.

It is thus seen, in accordance with the invention, that a method and apparatus for fetching an operand in a data processing system is provided wherein the system includes a central processing unit having an instruction register and a plurality of general registers and further includes a main memory unit coupled for communication with the central processing unit and means for addressing the general registers and the main memory unit to access the registers and selected storage locations in the memory to fetch data therefrom. As embodied herein, the central processing unit includes the CPU 10 and the instruction register and plurality of general registers include the registers 42 and G, respectively, as shown in FIG. 5. As further embodied herein, the memory unit is represented by RAM 14 and ROM 16 and the means for addressing the general registers and the main memory unit include the addressing apparatus provided in memory control unit 12 and decode and address control unit 62.

The invention further provides means for executing the step of entering an instruction word into the instruction register, the instruction word including an operand address code and an address modification mode code, the latter specifying the general storage location of an operand and the mode of addressing required to fetch it. As embodied herein, the step of entering the instruction word into the instruction register is carried out by the microprogram illustrated in FIG. 8 and the apparatus associated therewith. The instruction word, as illustrated in FIG. 4 includes operand address code B and address modification mode code IX.

Still further, the invention provides means for performing the steps of determining from the address modification mode code whether an operand is stored in the general registers or in the main memory and of deriving the address of the operand from the operand address code in accordance with the mode of addressing specified by the address modification mode code. As embodied herein, microprogram step S2 shown in FIG. 8 determines in response to the YES condition that the operand is stored in the general registers and in response to the NO condition that the operand is stored in the main memory. Furthermore, step S2 establishes the operand address B for the direct register address mode and the steps S7-S12 derive the operand address Y for the indirect register and index address modes.

Additionally, the invention provides means for performing the step of executing an operand fetch in either the general registers or the main memory at the address derived in the last-mentioned step. As embodied herein, the microprogram steps S3 snd S13 shown in FIG. 8 operate in response to the determination made in step S2 and to the address established in step S2 or steps S7-S12 to fetch operand D2 from either the general registers or the main memory.

It will be apparent to those skilled in the art that various modifications and variations can be made in the embodiment of the invention herein described without departing from the spirit and scope of the invention.

What is claimed is:

1. A method for fetching an operand in a data processing apparatus having a central processing unit including an instruction register and a plurality of general registers, said apparatus further including a main memory unit coupled for communication with said central processing unit and means for addressing said general registers and said main memory unit to access said registers and selected storage locations in said memory to fetch data therefrom, the addresses used to designate said registers being identical to the addresses used to designate a portion of said accessible memory storage locations, said method comprising the steps of:

- entering an instruction word into said instruction register, said word including an operand address code and an address modification mode code, the latter specifying by selected bit combinations the general storage location of an operand and the mode of addressing required to fetch it;
- determining from the bit contents of said address modification mode code whether an operand is stored in said general registers or in said main memory;
- deriving the address of said operand from said operand address code in accordance with the mode of addressing specified by said mode code, said operand address code including either the complete address in said general registers of said operand or the complete address in said general registers of a main memory address code applicable for deriving the address of said operand from data located within said main memory unit; and
- executing an operand fetch in either said general registers or said main memory, depending on the results of said step of determining, at the address derived in said deriving step.

2. The method set forth in claim 1 wherein when said step of determining indicates that said operand is stored in said general registers said mode code specifies the direct register address mode and said operand is fetched from the general register addressed by said operand address code.

3. The method set forth in claim 1 wherein when said step of determining indicates that said operand is stored in said main memory and said mode code specifies an indirect address mode, said operand is fetched from an address in said main memory derived by reading the contents of the general register addressed by said operand address code.

4. The method set forth in claim 1 wherein said central processing unit includes arithmetic means and wherein said instruction word further includes an index address component code and wherein when said step of determining indicates that said operand is stored in said main memory and said mode code specifies an index address mode, said operand is fetched from an address in said main memory derived by adding in said arithmetic means said index address component code and the contents of the general register addressed by said operand address code.

5. The method set forth in claim 1 wherein said central processing unit includes arithmetic means and wherein said instruction word further includes an index address component code and wherein when said step of determining indicates that said operand is stored in said main memory and said mode code specifies an indirect index address mode, said operand is fetched from an address in said main memory derived by summing in said arithmetic means said index address component code and the contents of the general register addressed by said operand address code and by reading the contents of the address in said main memory represented by the result of said summing operation.

6. The method set forth in claim 2 in which said address modification mode code is represented by a two bit binary number and said general register fetch is executed in response to the mode code 00.

7. The method set forth in claim 3 in which said address modification mode code is represented by a two bit binary number and said main memory fetch is executed in response to a mode code including a 1-bit.

8. The method set forth in claim 7 in which said main memory fetch is executed in response to the mode code 10.

9. The method set forth in claim 4 in which said address modification mode code is represented by a two bit binary number and said main memory fetch is executed in response to a mode code including a 1-bit.

10. The method set forth in claim 9 in which said main memory fetch is executed in response to the mode code 01.

11. The method set forth in claim 5 in which said address modification mode code is represented by a two bit binary number and said main memory fetch is executed in response to a mode code including a 1-bit.

12. The method set forth in claim 11 in which said main memory fetch is executed in response to the mode code 11.

13. The method set forth in claim 1 wherein said instruction word further includes a second operand address code and a function identifier code, said method comprising the further steps of:

- executing an additional operand fetch at the address specified by said second operand address code; and
- operating on said fetched operands to execute a function according to said function identifier code.

14. A data processing system having a central processing unit including an instruction register and a plurality of general registers, said system further including a main memory unit coupled for communication with said central processing unit and means for addressing said general registers and said main memory unit to access said registers and selected storage locations in said memory to fetch data therefrom, the addresses used to designate said registers being identical to the addresses used to designate a portion of said accessible memory storage locations, said system comprising:

- means for entering an instruction word into said instruction register, said word including an operand address code and an address modification mode code, the latter specifying by selected bit combinations the general storage location of an operand and the mode of addressing required to fetch it and the former including either the complete address in said general registers of said operand or the complete address in said general registers of a main memory address code applicable for deriving the address of said operand from data located within said main memory unit;
- first detection means responsive to the outputs from said instruction register for detecting said address modification mode code and for indicating in accordance with said code whether said operand is stored in said general registers or in said main memory; and
- fetch means controlled by said first detection means for causing said addressing means to execute an operand fetch in either said general registers or in said main memory based on the indication generated by said detection means, said fetch being executed at the address of said operand derived from said operand address code.

15. The data processing system set forth in claim 14 wherein:

said fetch means responds to an indication that said operand is stored in said general registers to control said addressing means to fetch said operand from the general register addressed by said operand address code.

16. The data processing system set forth in claim 14 further comprising second detection means for indicating the mode of addressing based on said address modification mode code and wherein:

said fetch means responds to an indication from said first detection means that said operand is stored in said main memory and to an indication from said second detection means that an indirect address mode is required, to control said addressing means to fetch said operand from an address in said main memory represented by the contents of the general register addressed by said operand address code.

17. The data processing system set forth in claim 14 further comprising arithmetic means included in said central processing unit and second detection means for indicating the mode of addressing based on said address modification mode code and wherein said instruction word additionally includes an index address component code, and wherein:

said fetch means responds to an indication from said first detection means that said operand is stored in said main memory and to an indication from said second detection means that an index address mode is required, to control said addressing means to fetch said operand from an address in said main memory represented by the sum, as determined by said arithmetic means, of said index address component code and the contents of the general register addressed by said operand address code.

18. The data processing system set forth in claim 14 further comprising second detection means for indicating the mode of addressing based on said address modification mode code and wherein said instruction word additionally includes an index address component code and wherein:

said fetch means responds to an indication from said first detection means that said operand is stored in said main memory and to an indication from said second detection means that an indirect index address mode is required, to control said addressing means to fetch said operand from an address in said main memory represented by the contents of an address in said main memory represented by the sum of said index address component code and the contents of the general register addressed by said operand address code.

19. The data processing system set forth in claim 14 wherein said instruction word further includes a second operand address code and a function identifier code, said system further comprising:

means for controlling said fetch means to execute an additional operand fetch at the address specified by said second operand address code; and means for operating on said fetched operands to execute a function according to said function identifier code.

* * * * *